United States Patent [19]

Pritchard

[11] 4,071,301

[45] Jan. 31, 1978

[54] CORNER GUSSETT

[76] Inventor: Roger D. Pritchard, 100 S. 17th St., Sebring, Ohio 44672

[21] Appl. No.: 745,437

[22] Filed: Nov. 26, 1976

[51] Int. Cl.$^{2}$ .......................... E04B 1/38; B25G 3/00; F16B 7/00

[52] U.S. Cl. ...................................... 403/231; 52/475; 52/657; 403/295

[58] Field of Search .......................... 52/657, 656, 475; 403/191, 231, 266, 267, 270, 271, 272, 401, 406, 295; 248/220.1, 248, 235, 247; 211/90

[56] References Cited

U.S. PATENT DOCUMENTS

| | | | |
|---|---|---|---|
| 1,263,724 | 4/1918 | Zagora | 248/235 |
| 3,113,678 | 12/1963 | Dickinson | 211/90 |
| 3,818,672 | 6/1974 | Moore | 403/295 |

*Primary Examiner*—John E. Murtagh

[57] ABSTRACT

A corner gusset for fastening the corners of a hollow frame structure such as those employed in the fabrication of some types of doors. The gusset comprises a first member providing two legs in the general form of an angle bracket with inwardly turned end flanges, and a second member, comprising a draw-bar, fixed in a spanning relation between the two legs of the angle bracket. Opposed end portions of the draw-bar are angled relative to the main span thereof to lie against the respective inner faces of the two legs adjacent the inwardly turned end flanges. An outwardly extending lug from each of the angled end portions extends through a companionately shaped end sized hole through one of the inwardly turned end portions to securely hold the two members in assembly. When the assembled gusset is inserted in place in a corner of the hollow frame structure, fasteners such as screws are engaged through appropriately positioned holes in the two hollow frame members, defining said corner, and mating holes in the gusset. The structure is inherently designed and proportioned to provide a light weight but strong gusset in which very substantial material savings are insured.

2 Claims, 4 Drawing Figures

CORNER GUSSETT

BACKGROUND OF THE PRESENT INVENTION

Hollow frame doors such as screen doors, for example are comprised of parallel top and bottom rails and parallel side rails, miter joints being provided at the corners to join the respective rails. The various rails of the door are preferably hollow and are generally rectangular in cross section. It is common practice to join the mitered corners by means of generally angular gussets comprised of a right angular base plate with edge flanges, the gussets being disposed within the connecting hollow rails. Obviously, a door of this nature is only as rigid, at the corner joints, as the gussets which form the connections between the adjoining rails. Various forces created by the stresses and strains imposed on the door from its own weight as well as from usage often flex, bend or twist the gussets, resulting in the opening of one or more of the miter joints.

While the gusset of the present invention is particularly adopted for use in the construction of screen doors, it is equally adaptable to the construction of other types of doors, windows, etc., and many articles where it is desired to join together articles at corners, or solid frames with miter corner joints.

It is therefore a principal object of the present invention to provide a gusset for joining the miter joints of a hollow frame structure which provides the necessary rigidity and strength to prevent the miter joints from opening up, and which is designed to use substantially less material than other gussets heretofore used.

It is a further object of the invention to provide a gusset comprised of a first member providing two legs in the general form of an angle bracket with inwardly turned end flanges, and a second member, comprising a draw-bar, fixed in a spanning relation between the two legs of the angle bracket, including opposed end portions, angled relative to the main span thereof, engaged against the respective inner faces of the two legs inwardly of and adjacent to the inwardly turned leg flanges.

Another object of the instant invention is to provide an outwardly extending lug from each of the angled end portions to extend through a companionately shaped end sized hole through one of the inwardly turned end flanges, to securely hold the two members in assembly.

A still further object of this invention is to provide faster means, such as self tapping screws, passed through the outer edges of the doors and through enlarged clearance holes, provided in the angle bracket leg portions, and into threaded engagement in holes in the angled end portions of the draw-bar.

DETAILED DESCRIPTION OF A PREFERRED FORM OF THE INVENTION

Figure 3:
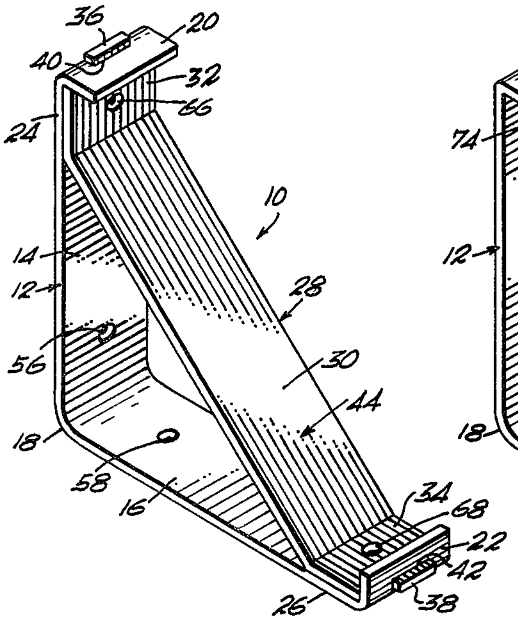
FIG. 3 is a perspective view of the gusset of the present invention.
Figure 4:
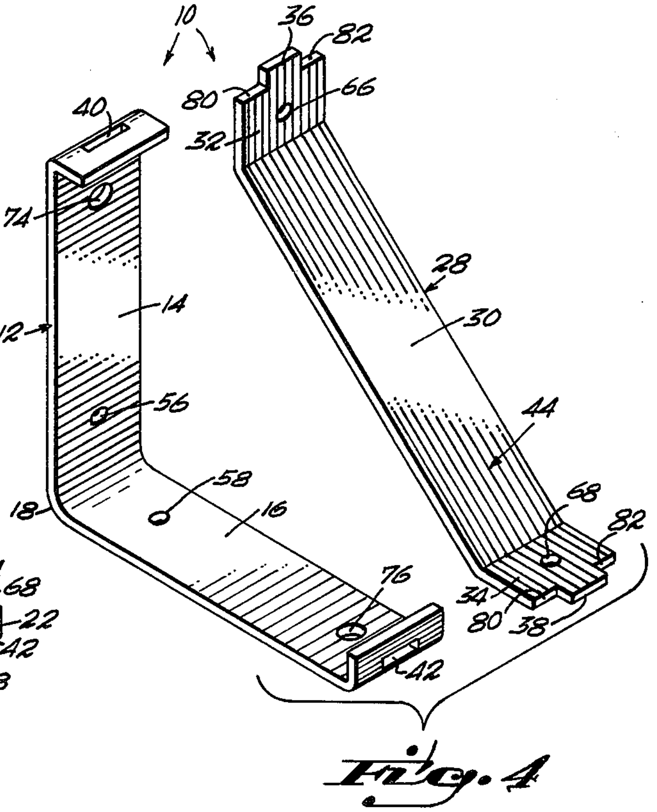
FIG. 4 is an exploded perspective view of the gusset.

With reference to the drawings in which like reference characters designate like or corresponding parts throughout the various views, the numeral 10 generally designates the gusset of the present invention. As best illustrated in FIGS. 3 and 4, the gusset includes a first member 12 providing two legs 14 and 16 in the general form of an angle bracket. Legs 14 and 16 define a rounded nose 18 at their apex and terminate in respective, inwardly turned end flanges 20 and 22 at their extended end portions 24 and 26.

A second member, comprising a draw-bar 28, includes a main central span 30 and opposed end portions 32 and 34, angled relative to the central span 30 to lie against the respective inner faces of the end portions 24 and 26 of legs 14 and 16. As best illustrated in FIGS. 3 and 4, the end portions 32 and 34 terminate in outwardly projecting, reduced width lugs 36 and 38, coplanar with the respective end portions 32 and 34, for engagement through companionately shaped and sized apertures 40 and 42 in the respective end flanges 20 and 22.

In assembly one lug, such as 36, may be inserted in an aperture such as 40. The second lug, such as 38 is then snapped into aperture 42 by the exertion of inwardly applied pressure forces in the general area, designated 44 on the central span 30. This may be readily accomplished by pressure forces exerted by the thumb, or one or more fingers of one hand in a minimal amount of time. If desired, the assembly operation may be performed mechanically. Because of the spring nature of the metal, a very tightly locked assembly is accomplished which cannot be accidentally displaced or separated. Due to the tight fitting of the members 24, 26 and 28 a strong structure is provided with minimal use of materials.

Figure 1:
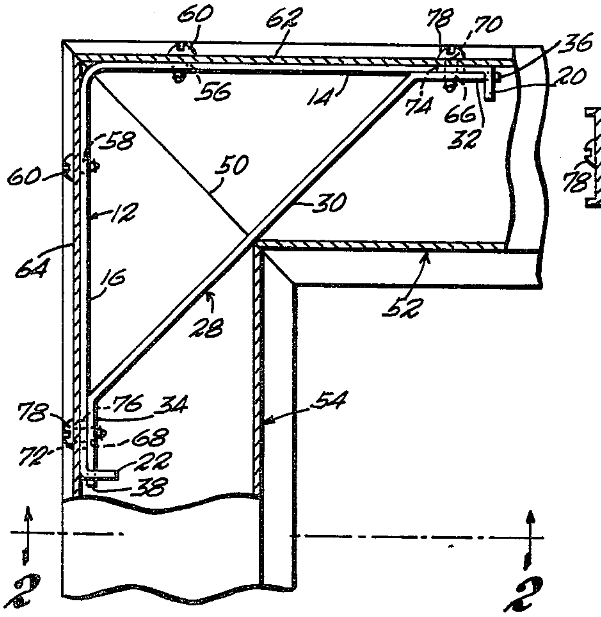
FIG. 1 is an elevational view of one corner miter joint of a hollow frame structure with the frame portions broken away to illustrate the gusset of the present invention.
Figure 2:
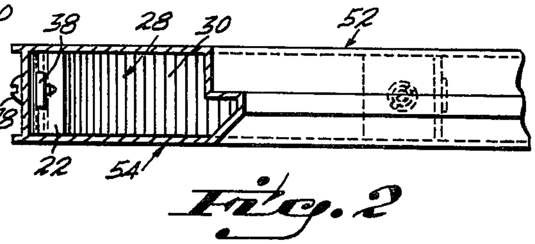
FIG. 2 is a cross sectional view taken along line 2—2 of FIG. 1.

FIGS. 1 and 2 illustrate a gusset 10 of the present invention fixed in a holding relation to a corner miter joint 50 between a hollow top rail 52 which may be tubular or of an inwardly opening channel form, and a similar side rail 54. As best illustrated in FIG. 1, the legs 14 and 16 of gusset 10 are provided with respective holes 56 and 58 adjacent the rounded nose 18 for the reception of a suitable fastener means, such as the self tapping screws 60, engaged therein through appropriate aligned holes through respective outer rail edges 62 and 64 of top and side rails 52 and 54.

Similar holes 66 and 68 are provided in the end portions 32 and 34 of draw-bar 28 in alignment with respective holes 70 and 72 through rail edges 62 and 64. Enlarged clearance holes 74 and 76 are formed in legs 14 and 16, intermediate the respective pairs of holes 66, 70 and 68, 72. When screws 78 are tightened through the aligned holes 66, 70 and 68, 72 and intermediate clearance holes 74 and 76, the draw-bar 28 draws the miter joint 50 rigidly together.

Abutment edges 80 and 82 on the opposed sides of each lug 36 and 38 engage against the respective turned in end flanges 20 and 22, absolutely preventing outward movement of draw-bar 28 and separation of miter joint 50.

While a preferred form of the invention has been illustrated and described, it will be obvious to those skilled in the art that various changes and modifications can be made therein without departing from the true spirit of the invention as defined in the appended claims.

I claim:

1. A corner gusset for joining the end portions of two angularly related rails of a hollow frame structure having cooperating, inwardly opening channel shaped rail portions comprising, a first member, generally in the form of an integrally formed angle bracket;

a second member in a spanning relation to extended end portions of first and second angular legs of said angle bracket;

interengaging lock means between opposed end portions of said second member and said extended end portions;

means to attach said gusset within the two angularly related rails to form a rigid corner structure, an inwardly turned flange at the outer end of each of said extended end portions, said second member includes a main central span portion defining an outer obtuse angle relative to each of said legs, and a like obtusely angled outer end portion from each end thereof in an overlying relation to an inside face of said extended end portions, said interengaging lock means including a reduced width lug, extending outwardly from, and in a co-planar relation to each of said obtusely angled outer end portions for engagement through a companionately shaped and sized aperture through one of said flanges.

2. The corner gusset as defined in claim 1 including a pair of abutment edges, defined on said second member at the opposed sides of each of said reduced width lugs, for engagement against an inside face of one of said end flanges.

* * * * *